A. O. ABBOTT, Jr.
TIRE BUILDING MACHINE.
APPLICATION FILED DEC. 8, 1916.
1,255,073.
Patented Jan. 29, 1918.
9 SHEETS—SHEET 4.
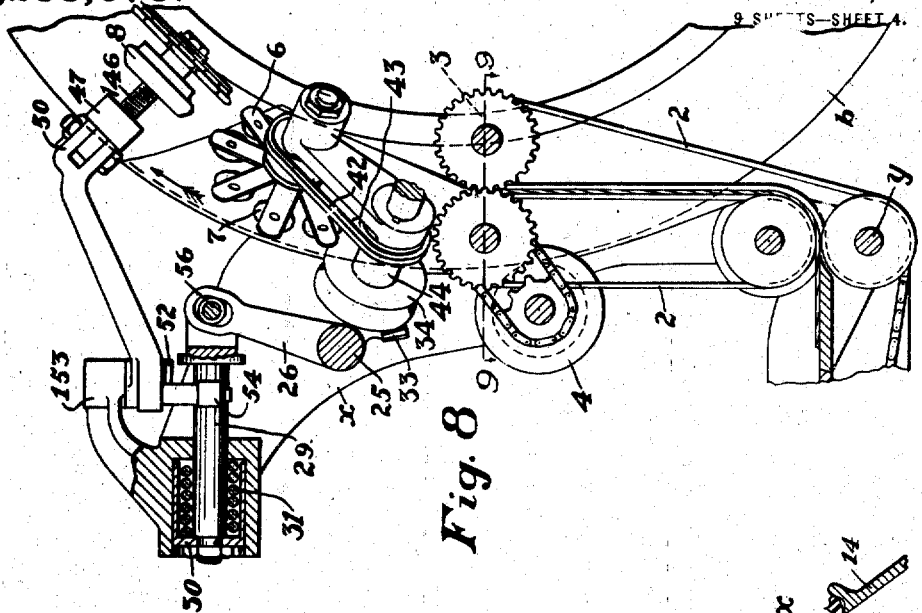
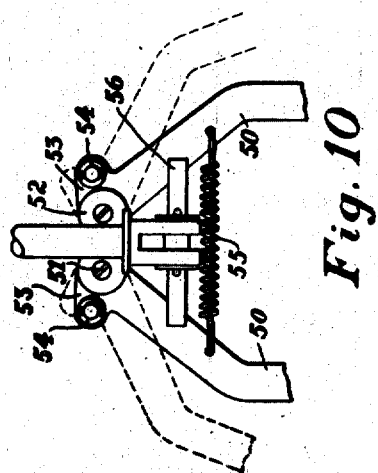
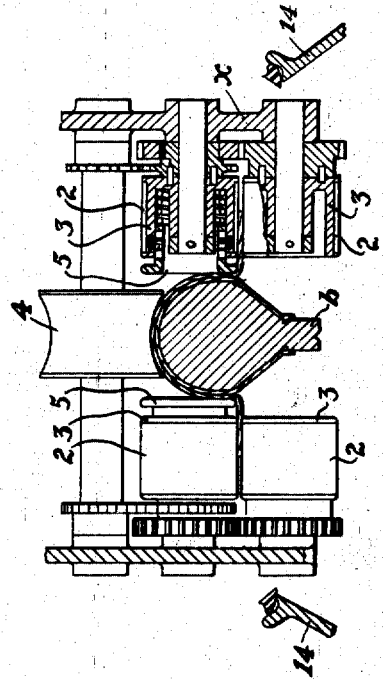
INVENTOR
Adrian O. Abbott Jr.
BY
Ralgemund A. Parker
ATTORNEY

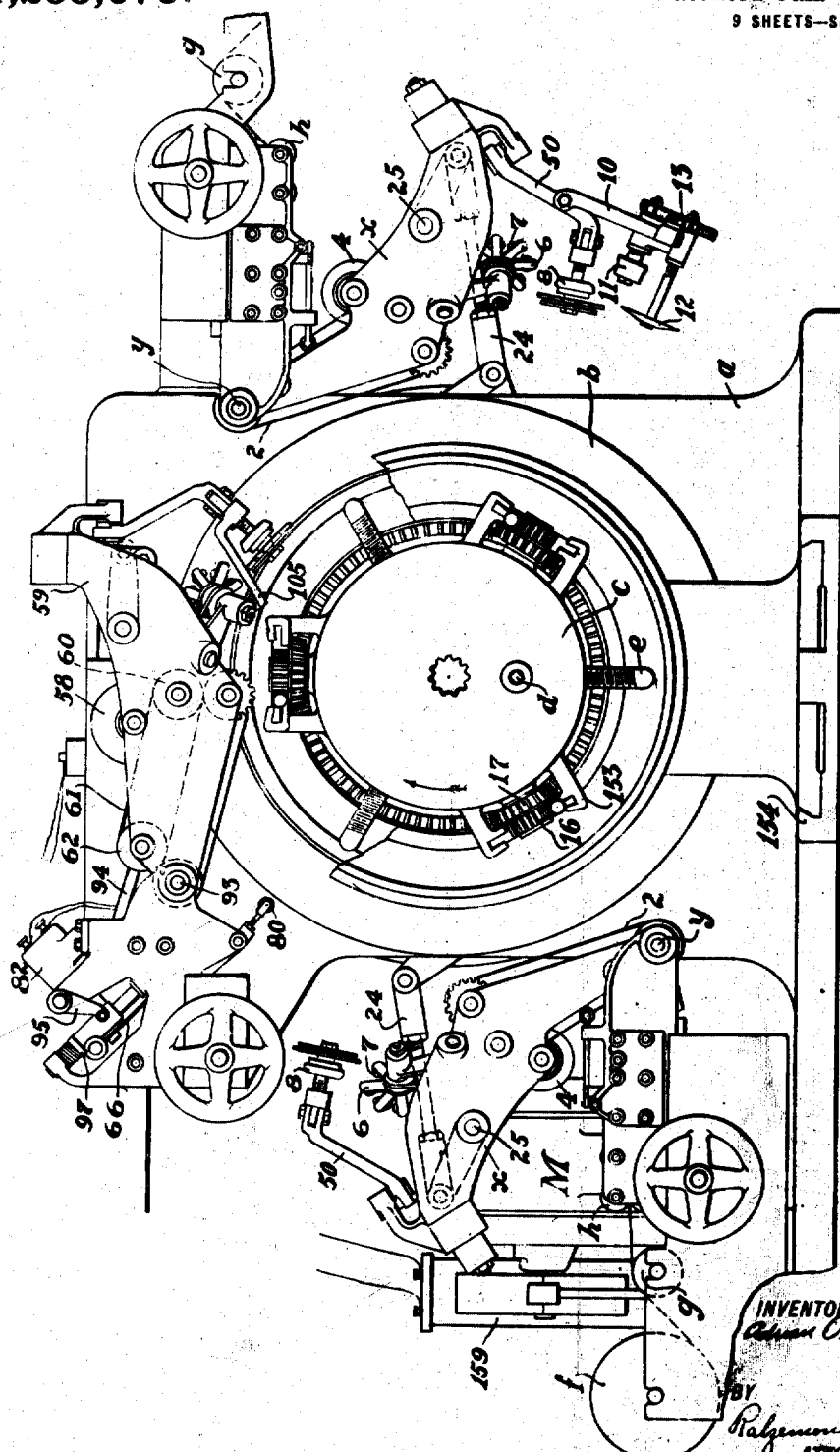

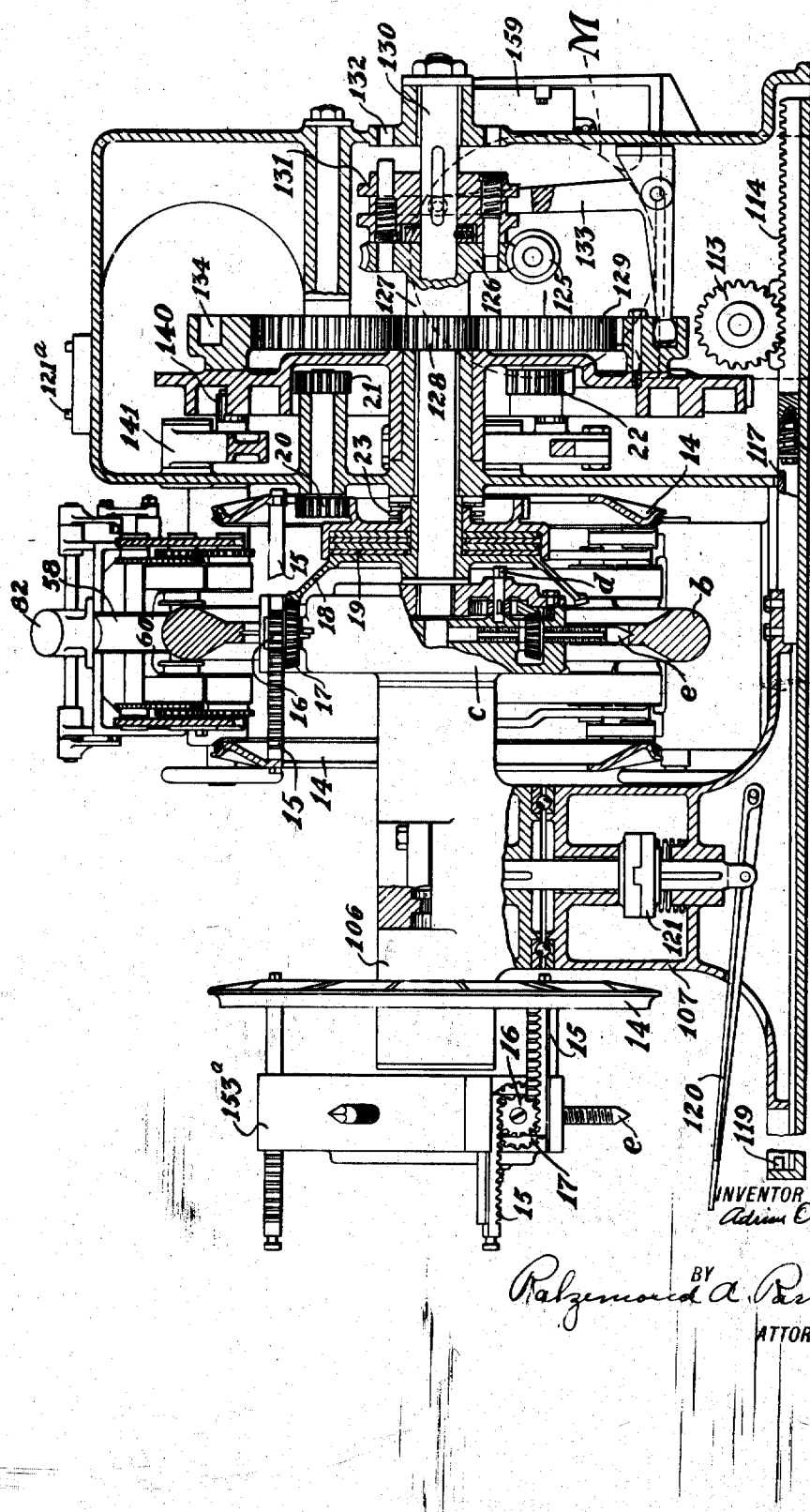

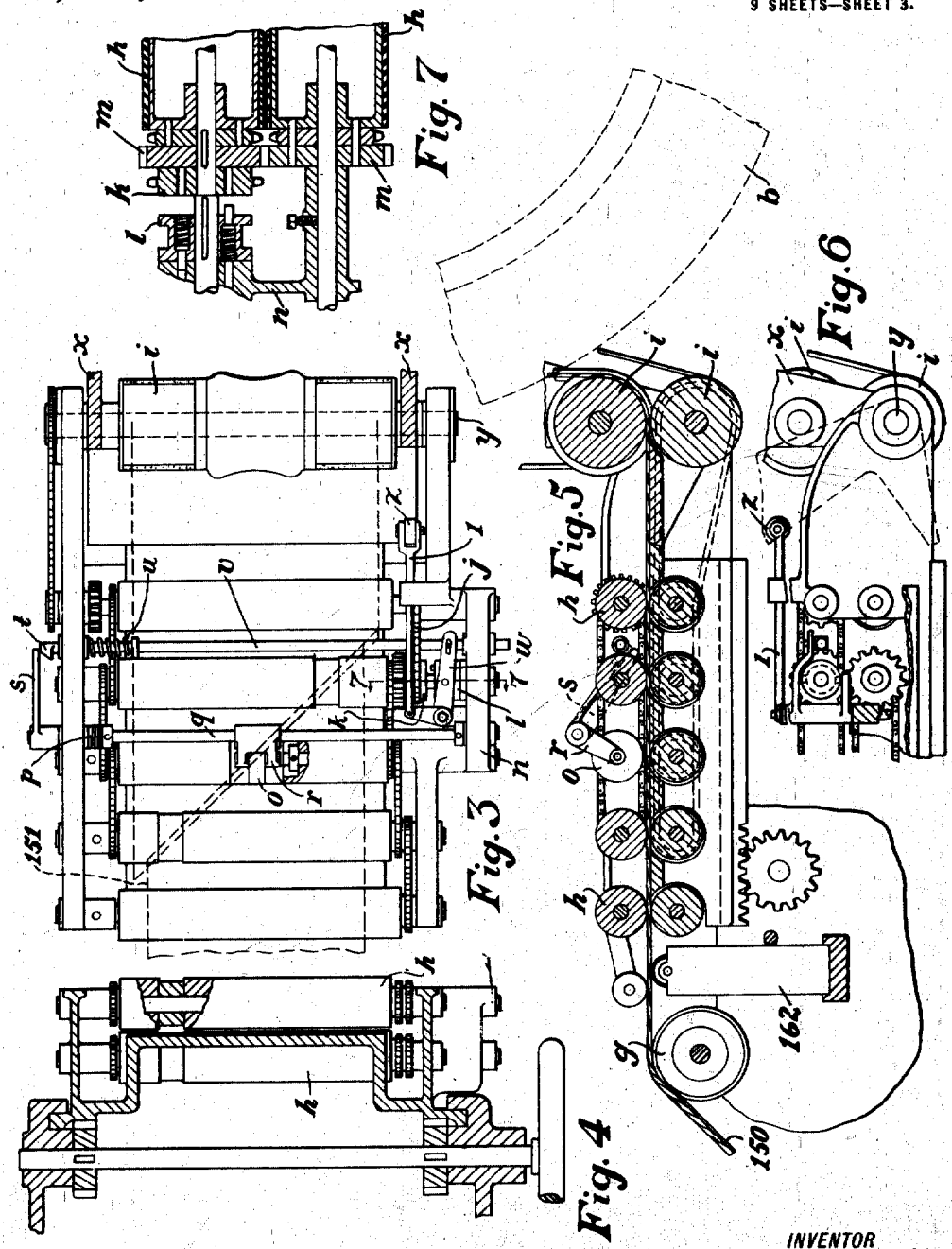

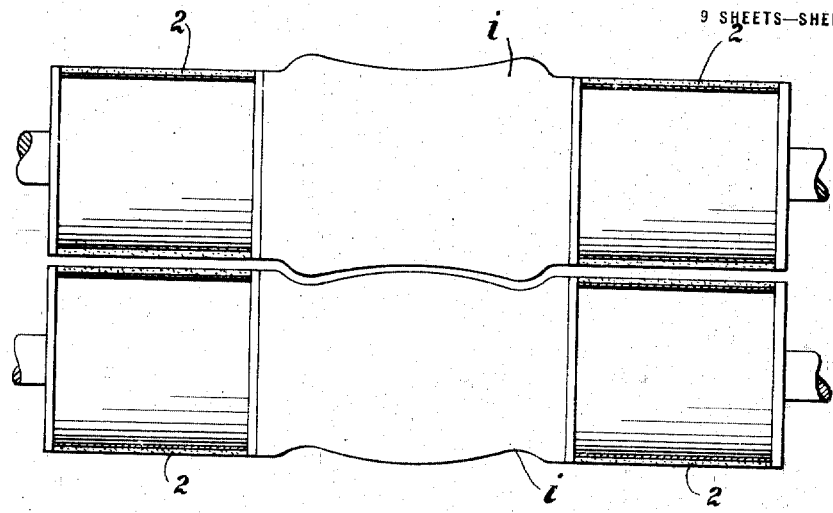
Fig. 11
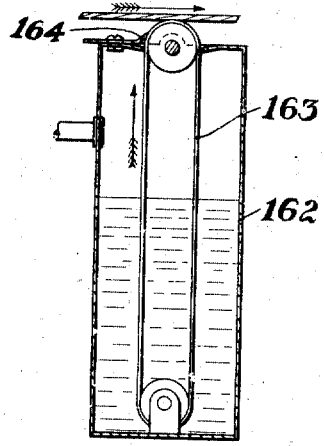
Fig. 12
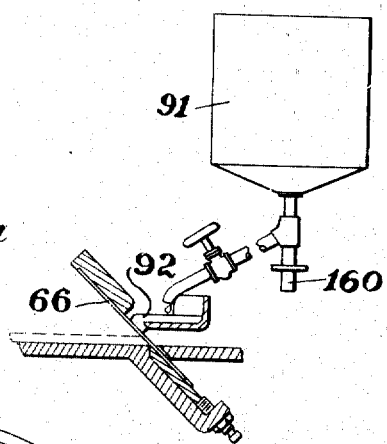
Fig. 13a
Fig. 13
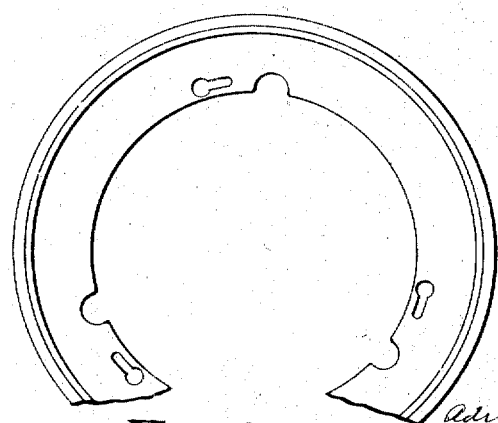
Fig. 33

A. O. ABBOTT, Jr.
TIRE BUILDING MACHINE.
APPLICATION FILED DEC. 8, 1916.
1,255,073.
Patented Jan. 29, 1918.
9 SHEETS—SHEET 6.
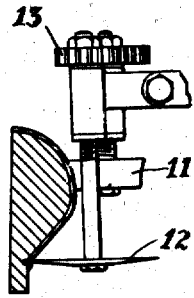
Fig. 14
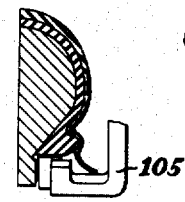
Fig. 20
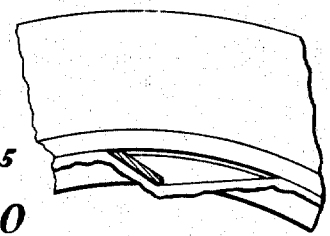
Fig. 19
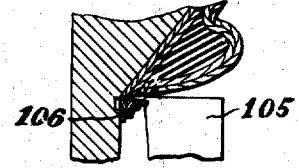
Fig. 18
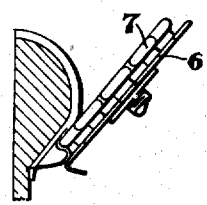
Fig. 15
Fig. 16
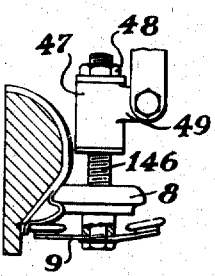
Fig. 17
Fig. 21
INVENTOR
Adrian O. Abbott Jr.
Ralzemond A. Parker
ATTORNEY

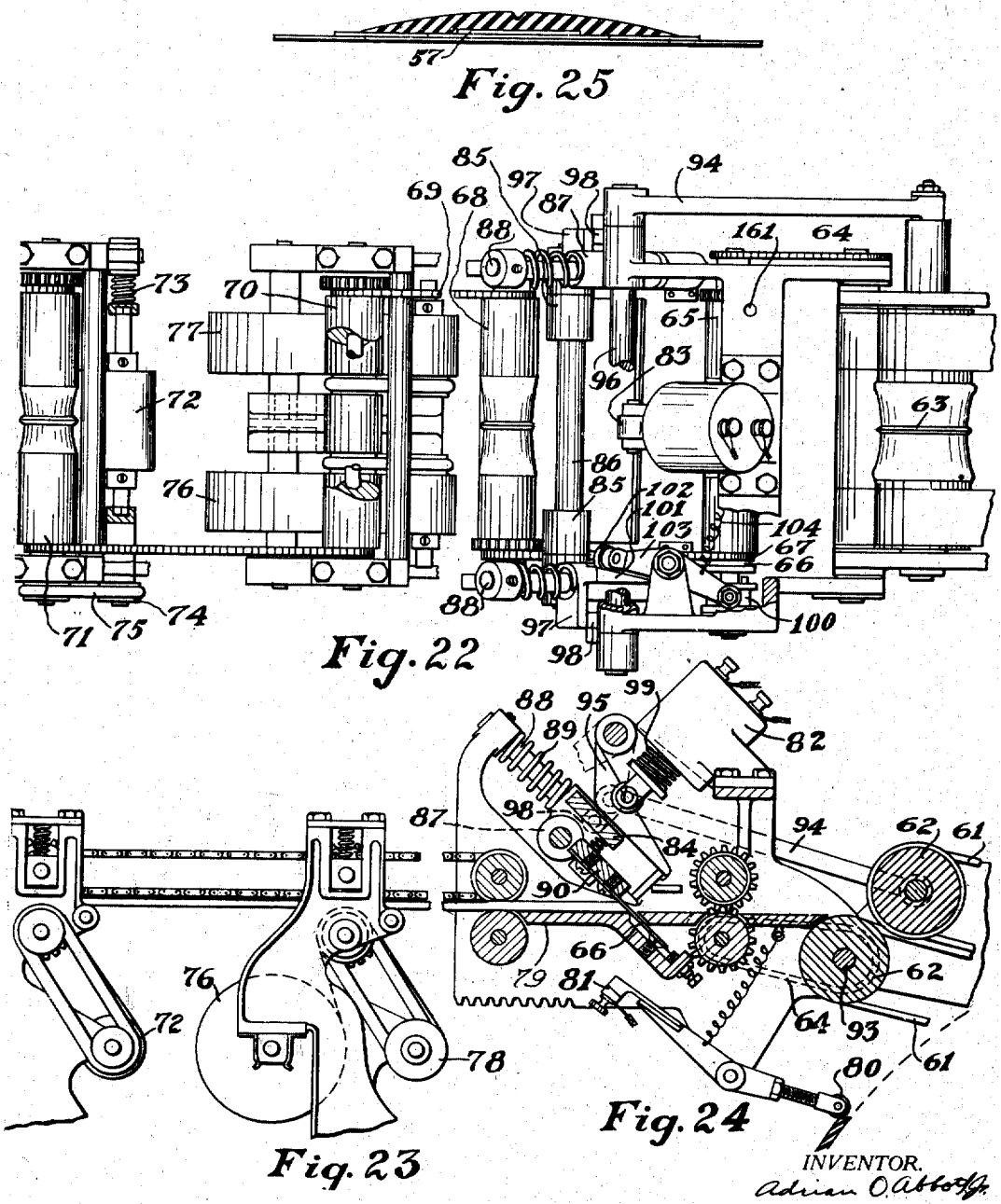

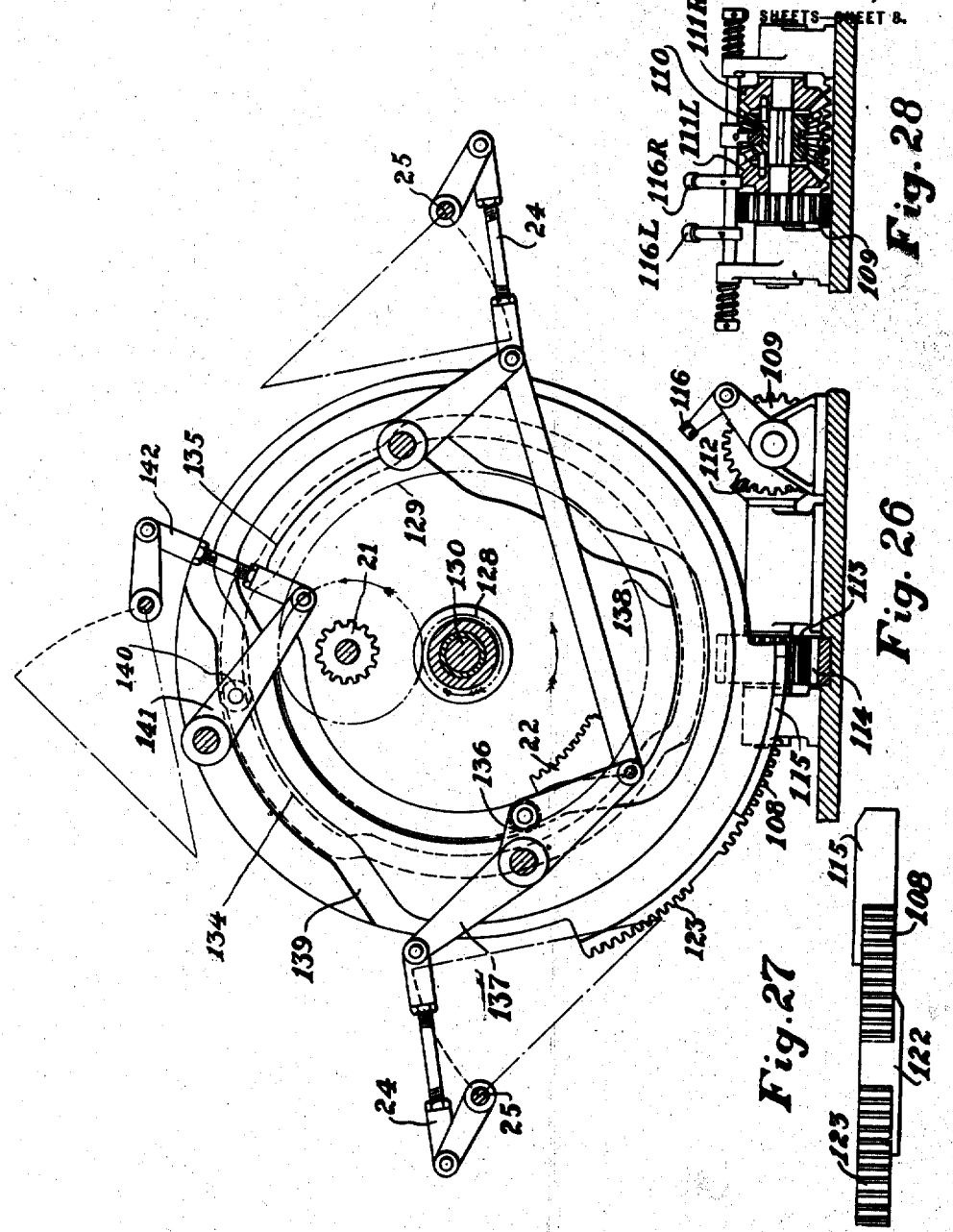

A. O. ABBOTT, Jr.
TIRE BUILDING MACHINE.
APPLICATION FILED DEC. 8, 1916.
1,255,073.
Patented Jan. 29, 1918.
9 SHEETS—SHEET 9.
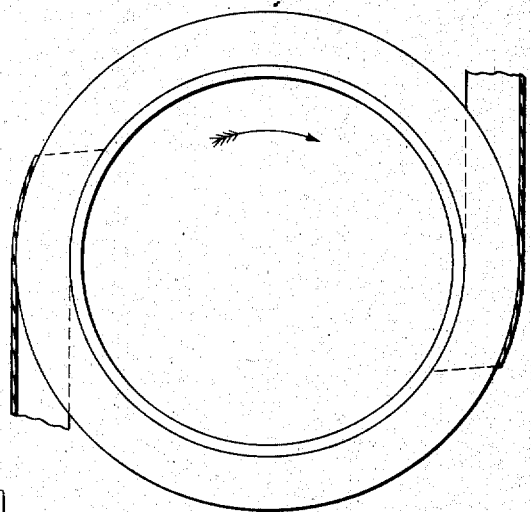
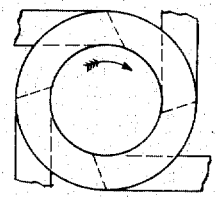
*Fig. 29*
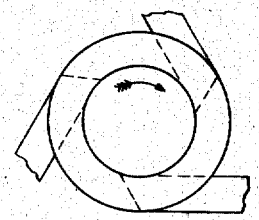
*Fig. 32*
*Fig. 31*
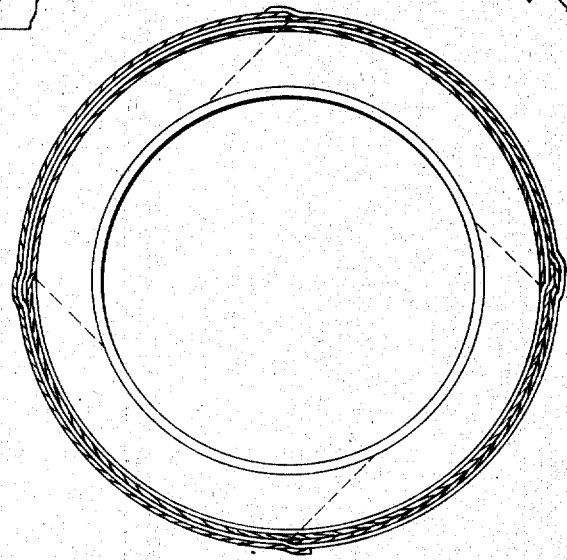
*Fig. 30*
INVENTOR.
Adrian O. Abbott, Jr.
BY
Raymond A. Parker
ATTORNEY.

UNITED STATES PATENT OFFICE.

ADRIAN O. ABBOTT, JR., OF DETROIT, MICHIGAN, ASSIGNOR OF ONE-HALF TO WILLIAM B. NORTON, OF DETROIT, MICHIGAN.

TIRE-BUILDING MACHINE.

1,255,073.   Specification of Letters Patent.   Patented Jan. 29, 1918.

Application filed December 8, 1916. Serial No. 135,757.

*To all whom it may concern:*

Be it known that I, ADRIAN O. ABBOTT, Jr., citizen of the United States, residing at Detroit, county of Wayne, State of Michigan, have invented a certain new and useful Improvement in Tire-Building Machines, and declare the following to be a full, clear, and exact description of the same, such as will enable others skilled in the art to which it pertains to make and use the same, reference being had to the accompanying drawings, which form a part of this specification.

This invention is a completely automatic tire rim machine save for the final vulcanizing process.

Heretofore machines have been projected and some have been used which were arranged to stretch a bias fabric laid on the core and smooth it over the sides of the core. These machines, however, are far from automatic and most of them require the core to be stopped when one complete ply has been laid; they then require the applying or fastening by the operator of the beginning of the second ply to the first ply, the throwing on of the power again to revolve the core, and a repetition of the operations until a number of plies have been laid that are used under the bead. The machine must then be stopped and the bead applied by the workman either as a separate ring or run on in the form of a strip. After the bead is applied, the machine again has to be started by the operator and the succeeding plies laid.

Now all these operations are automatically accomplished by this machine, requiring no interposition of the operator, and hence the tire casings are more reliably produced and approach a greater uniformity in quality. The machine also makes possible the building of a carcass of the tire shoe in much less time than required by the machines of the prior art.

Furthermore, this machine goes further in the building of the tire shoe than any projected or actually built. It not only builds a carcass but it applies the gum and fabric tread. Not only does the machine do this extra work but it is done at its proper time, automatically, without in any way depending upon the intervention of human agencies.

The machine is provided with an automatic gasolene swabber to moisten the gummed fabric stock that possibly has gotten a little too dry to properly adhere. The machine is also provided with a water feed to assist in the cutting of the rubber tread.

In the drawings,—

Figure 1 is a front elevation of the complete machine.

Fig. 2 is a cross section through the same.

Fig. 3 is a plan view of a portion of the fabric feeding apparatus.

Figs. 4 and 5 are projected cross sections and longitudinal sections, respectively, of the same.

Fig. 6 is a fragmentary projected side elevation of the same.

Fig. 7 is a fragmentary cross section on the line 7—7 of Fig. 3, the clutch and driving connections being omitted.

Fig. 8 is a side elevation of one of the fabric applying instrumentalities.

Fig. 9 is a cross section through the core and a portion of the fabric applying instrumentality and taken on the line 9—9 of Fig. 8.

Fig. 10 is a bottom plan view of the arms that carry the bead-covering roll and smoothing device.

Fig. 11 is an elevation of the main fabric-feeding rolls.

Fig. 12 is a section of the gasolene swabber.

Fig. 13 is a view of the device for furnishing water to the tread-cutting apparatus.

Fig. 13ᵃ is a detail of the end of the felt-pad holder used in connection with this moistening device.

Fig. 14 is a detail of the trimmer.

Fig. 15 is a detail of the rotating fabric-layer and smoother.

Fig. 16 is a diagrammatic detail of the same, showing the pitch of this device to the core.

Fig. 17 is a detail of the combined fabric-layer and smoothing device for rounding the bead with the fabric, and hereinafter referred to as the bead-covering roll and smoother.

Fig. 18 is a detail showing a device for plowing off the waste partially separated by the trimmer.

Fig. 19 is a similar detail but looking at the core shown in Fig. 18 from the right of this figure.

Fig. 20 is another view of this plowing device.

Fig. 21 is a cross section through the core and the fabric-laying and smoothing apparatus, showing more particularly the means by which the strokers are applied to the core.

Fig. 22 is a plan view of the tread applying instrumentality.

Fig. 23 is a projected side elevation of part of the same.

Fig. 24 is a projected longitudinal section of part of the same.

Fig. 25 is an end view of the composite tread.

Fig. 26 is an elevation of the master cam and the connections.

Fig. 27 is an edge view of a portion of the cam, looking at it from the lower left hand corner of Fig. 26.

Fig. 28 is an elevation partly in section of one of the automatically-shifted clutches shown partly in Fig. 26.

Fig. 29 is a diagrammatic view showing how two plies can be started at opposite sides of the core at the same time.

Fig. 30 is a section of the core showing how such plies will rest one above the other.

Fig. 31 is a diagrammatic view showing how three could be applied simultaneously.

Fig. 32 is a similar view showing how four could be applied simultaneously.

Fig. 33 is a front view of one of the bead-carrying rings.

(Fig. 1) $a$ is the frame which carries all the machine parts. $b$ is the core upon which the tire shoe is built. This is carried upon a chuck $c$ (refer to Fig. 2). This chuck works upon the familiar principle of turning a key $d$ which rotates a beveled gear in mesh with the beveled gear that acts as a nut with respect to the chuck arm $e$ that is held from rotation but allowed to slide. Hence turning the key will spread the chuck or contract it to engage or disengage the core.

Referring again to Fig. 1, it will be seen that there are three groups of instrumentalities grouped around the core: one at the lower left hand corner which is a fabric-feeding, applying and smoothing instrumentality; one at the upper right hand corner which is a second fabric-feeding, applying and smoothing instrumentality; and a third instrumentality is located at the top of the core and this is the tread applying instrumentality.

Before taking up the particular description of the specific appliance, attention is drawn to the type of carcass that is preferably built upon this machine. Instead of applying the plies at different starting points on the core, depending upon the judgment of the workman, I apply the fabric from a plurality of determined points on the core: as for instance, in Fig. 29 I have shown one ply of fabric started on one side and the other ply of fabric started on the diametrically opposite side. In Figs. 31 and 32 three and four plies of fabric simultaneously applied are respectively shown. Now if one will refer to Fig. 30 and trace, for instance, the ply that is applied directly to the core beginning at the right side thereof, he will find that it runs half way around the core and then over the end of the ply which is applied directly to the core beginning at the left hand side of the core. The ply then continues around and is spliced over the beginning of this ply and over the middle portion of the other ply as shown at the right in Fig. 30. This makes a very strong joint as it has an intervening ply of continuous material. This plural point simultaneous feed also saves just so much time in the completion of the tire, depending upon the number of plies simultaneously fed.

*The automatic fabric feeding apparatus.*

Now referring to Figs. 3, 4, 5, 6 and 7, this apparatus can be understood. Five pairs of rollers are shown. The fabric comes in alternate narrow and wider strips from the storage roller $f$ (Fig. 1) up over the roller $g$ (Fig. 5) which acts as a take-up roll to peel off the liner 150. The fabric then feeds through the five pairs of rollers $h$. The fabric is carried on the storage roll $f$ cut in predetermined lengths and widths. It will be noted that the end pairs of rollers are solid. The intervening three pair of rollers are divided and journaled so that one end of the roller can rotate independently of the other roller. The division points between the two parts of a roller are substantially at the quarter, half and three-quarter points of succeeding rollers so that a line drawn through the three division points will be on the bias and substantially parallel to the spliced end edges of the fabric. This is shown well in Fig. 3 where the fabric appears in dotted lines and designated 151.

The driving of these rolls is accomplished by chains connected with the set of main feed rolls $i$. It will be seen that the chain connections are used on both ends of the rolls $h$ except the farthest one from the main roll $i$. This provides an independent drive for each end of the divided rolls so that the divided ends may be independently driven. The power is transmitted from the first roll to the second roll, which is a divided roll, by means of a chain $j$ and a loose gear $k$ (Fig. 7). By shifting the clutch *l* inward, the spring pins engage in one of the apertures of the loose gear *k* and lock the same to the shaft upon which is fastened the feed roll *h*. The bottom feed rolls are driven from the top feed rolls by intermeshing gears *m*. When the clutch *l* is shifted to the left in Fig. 7, the spring pins will engage in apertures in the roller frame *n*, thus locking against further movement the shaft of the roller *h* and consequently the whole train of rollers on that side of the feed.

This clutch is shifted in the following manner: The roller *o* between the spliced parts of the middle divided feed roller *h* normally tends to bear upon the fabric because of the efforts of the torsional spring *p* secured around the rock shaft *q* upon which this roller is carried by the arm *r*. On the end of this rock shaft is a trip arm *s* which, when the roller *o* is traveling over the normal thickness of the fabric, is held up in such position as to engage behind the shoulder of the catch *t*. However, when the roller *o* mounts the double ply made by the splicing of the two ends of succeeding plies of fabric as shown in Fig. 5, this raises the roller *o* as shown in this figure, tipping the trip arm *s* just enough to clear the shoulder of the catch *t*. This results in the contractile spring *u* pulling the rod *v* toward the clutch-shifting arm *w*, resulting in shifting the clutch *l* outward so as to bring the spring pins into engagement with the apertures in the stationary frame *n*, as shown in Fig. 7. Consequently it is evident that not only is the power thrown off from the rear train of rollers and part rollers, but they are also locked from further movement. However, the forward train of rollers and part rollers still move on, resulting in pulling the plies apart at the spliced joint, and hence automatically spreading the plies as distinguished from spreading them by hand or shearing the fabric by hand when the operator believes a sufficient length has been fed upon the core, as has been the previous practice.

The forward train of rollers and part rollers and the fabric applying and smoothing devices continue on until the ply has been fed to the core and carefully fitted thereupon in the manner hereinafter to be described.

The master cam hereinafter detailed then causes the frame *x*, upon which the fabric applying and smoothing devices are located, to swing back upon the shaft or fulcrum *y* (Fig. 6). In doing so the frame assumes the position shown in the dotted lines (Fig. 6), thereby striking the roll *z* attached to the arm 1 connected by an arm rigidly attached to the clutch-shifting arm *w*. It is, therefore, evident that the clutch *l* will be shifted into engagement with the sprocket *k* (Fig. 7) and will again connect the rear train of rollers and part rolls with the power when the power is again transmitted to the feeding apparatus by the frame *x* being shifted back upon the core by the master cam, as will be pointed out.

*Fabric applying and smoothing apparatus.*

Two main feed rolls *i, i* (Figs. 3, 5 and 6) are shown in a large view, Fig. 11. These feed rolls have convex and concave center fabric bearing portions and have smooth belt bearing end portions grooved and beaded at the outside zones. It will be noted that the convex and concave central portions approach close to each other only at the middle. The consequence is that they pinch the fabric only at the very center. Hence the fabric is only gripped at the center while the end portions of the fabric-carrying portions of the rolls merely serve as guides for the fabric, and the bead arrangement and the clearance between fabric and rolls at end zones of fabric-carrying portions bends the edges of the fabric in toward the center to provide fullness for the stretching which takes place only along the center of the fabric when the feed rolls *i* grip the fabric.

The belt-carrying ends of the rolls *i, i* carry the belts 2 preferably lined with sheet metal strips and best shown in Fig. 8. It will be seen that the up-running portions of these belts parallel each other in a continuous relation and extend upward by the pulleys 3 behind the intermeshing gear wheels shown in Fig. 8. These pulleys 3, two pairs on each side of the core, are detailed in Fig. 9. It is evident that the up-running portions of the belts 2 and these pulleys 3 serve the useful purpose of carrying the outlying portions of the fabric ply on to the core in an outstretched and comparatively smooth condition, doing away with possible longitudinal creases likely to come into the fabric by reason of being stretched fairly taut. Right adjacent these pulleys 3 the fabric is carried by these belts between the roller 4 and the core. The pressure of the roller 4 upon the core serves to cause the fabric to adhere to the core, which rotating, pulls the fabric upon it.

It is clear that without the use of the belts the free end of a new ply could not be carried automatically on to the core, and it has been the practice in all the previous tire-making machines with which I am familiar, to manually guide the oncoming end of a new ply on to the core, where it is caused to adhere by hand pressure. The belts, therefore, perform the dual function of keeping the outlying portions of the plies smoothed out and also making possible the carrying of a free end of an oncoming ply on to the core without any human help.

The fitting of a flat piece of fabric upon the core is attended by the well-known stretching operations which are necessary to apply it to the core without puckering. To this end the fabric is always furnished in strips that are cut on the bias, and in order to make provision for the increased distance around the core at the widest part, it is necessary to stretch the fabric. This, of course, makes the edges of the fabric when formed into a complete annulus much shorter and better adapted to fit into the undercut portions of the core and the sides of the core where the distances annularly around the core are shorter than on the tread portion of the core. This stretching is accomplished in several ways in the prior art, one of the most common being the use of a roller upon which an adjustable braking effort is applied to retard the roller and consequently put a stress upon the roller when it is being pulled off from such roller preparatory to application to the core. In the present instance the stretching is accomplished only at the center of the strip by the pull of the core upon the fabric between the core and the feed rolls. The method is the old one of driving the feed rolls at a slightly less peripheral speed than the core through the belt connections 2 and the chain connections with the roller 4 that bears upon the core, and hence the peripheral speed of the portions of the rollers $i, i$, that contact with the middle of the strip of fabric, being less than the peripheral speed of the tread portion of the core, it is evident that the center of the fabric will be stretched varying with the difference in the speed between the tread portion of the core and the central portions of the rollers $i, i$. Inasmuch as the side portions of the core round off sharply it is evident that there will be no greater speed between the side portions of the core and the side portions of the feed rolls, but even if there were, this would not matter as the side portions of the feed rolls clear the fabric slightly and hence do not grip it but merely bend it in to allow stretching to take place at the center without taking place at the edge zones.

Now, in applying the fabric and fitting it around the core, four distinct zones of work can be marked out. There is the tread portion of the core upon which the fabric is fitted by the common concave roll 4 of the prior art. There is the side portion of the core to which the fabric has usually been applied by some form of roller having a peripheral contact. There is the undercut zone where the fabric has usually been stretched and fitted by means of either hammers, reciprocating fingers or spinning rolls, the last requiring an excessive speed of the core and a separate operation. The two former methods the applicant is advised have been unsuccessful in actual practice. The fourth zone of work is that of securing the final plies over and under the bead. No "creasing" or "stitching" of the fabric into a groove in the core to hold it thereto is required. This operation is completely dispensed with as the core is provided with a suitable cement so that the first ply of fabric sticks to it.

The second class of work, that is, smoothing the fabric over the side zones of the core, is effected very nicely by the side-swiping action of the spring-pressed sleeve portions 5 (Fig. 9) of the pulleys 3. These will be called the smoothing rings as they have a turned-over flange that forms them into a ring. They have a pin and slot longitudinal connection with the pulleys 3 and consequently rotate therewith but slide in and out against the resistance of the spring. These smoothing rings 5 serve to smooth and stretch the fabric over the side zones of the core. The next zone, the undercut zone, is fitted with the fabric by means of the "smoothing rotator" or rotating strokers 6 (Figs. 8, 15 and 16) which are in effect, a mutilated disk. We speak of them as a mutilated disk for a disk set at the same pitch would do this work but not as effectively as the rotating strokers. Such a disk would require, however, a specially developed core.

The rotating strokers comprise a plurality of radial spring arms upon which are mounted stub-like rollers 7. The radial arms or spring arms are flexible so as to bear securely against the fabric when applied thereto with any pressure, and are also capable of following the contour of the core by reason of their flexibility The pitch of this stroking member is shown diagrammatically in Fig. 16. It has the pitch of the undercut portion of the core and then a pitch away at the rear of the undercut portion of the core for the purpose of allowing the rollers, in the ascending, to travel away from the core, so as not to undo the work that has already been done in fitting and stretching the fabric on the undercut portion of the core.

It will be seen in Fig. 16 that were the disk rigid it would cut lightly into the core, but of course it does not do this because the spring arms flex under the pressure, but this accomplishes a useful function in bringing considerable pressure upon the fabric in this operation.

In Fig. 15 the action of this smoothing or stroking device is shown in connection with the bead. It will be seen that it works substantially the same before and after the bead is applied but that after the bead has been applied it helps to form the fabric around the top of the bead. In this operation the ends of the spring arms coöperate with the rollers and serve to apply the fabric to the extreme outside portion of the bead.

Anti-friction rollers 7 are considered a great improvement over the use of a plain disk as they effect the smoothing operation and yet have the necessary capability of turning when coming into contact with the fabric so as not to tend to tear or unduly stress portions of the fabric in stroking it or fitting it into place, and do not take off the skim-coat of gum like a disk will.

The rotating strokers are positively driven as distinguished from most of the prior art smoothing rolls which are driven only by contact with the core. The stroking rolls are driven at a somewhat greater speed than the speed of the core by reason of the speed ratio being stepped up by the sprockets and chain (Fig. 8). These stroking arms and rollers driven at this somewhat increased speed, strike the fabric and stroke it with a regularity and continuity of action which effectively stretches it in a general radial direction and fits it under the undercut portions.

Swabbing devices.

In Fig. 12 the devices for automatically swabbing the fabric with gasolene are shown. This comprises a tank 162 (see also Fig. 3). A belt 163 runs into this tank around two pulleys one of which forces the belt up against the under side of the fabric. An adjustable wiping clip 164 may be moved to or from the belt to regulate the amount of fluid carried up upon the fabric. This swabbing is now done by hand to moisten the gum on the stock to make it as adhesive as possible which might not otherwise be the case because of the stock becoming dry.

Bead-covering devices.

In Fig. 17 a detail of the device for fitting the fabric over the bead is shown. These devices are located on each of the fabric applying instrumentalities, but of course are substantially functionless when the plies are being put on before the bead is put on. However, when the bead has been applied, the stroking device comes in operation. It consists of a bead-covering roller 8 having a periphery in cross section complementary to the periphery of the upper and outside portion of the bead in cross section. On the end of the hub that carries this roller 8 is a spider of spring arms 9 of the same general character as the stroking device already referred to. These spring arms are provided with the same rollers. The spring arms normally tend upward as shown at the right in Fig. 17. The result is when they are brought against the bead they are stressed as shown at the left in Fig. 17, thereby affording pressure on the fabric and serving to stretch and fit it under the bead.

The means for applying the fabric laying and smoothing devices to the core.

The fabric laying and smoothing devices and the bead-covering devices are carried upon the swinging frame $x$. Hence by pulling inwardly the arms 24 (Fig. 1) the devices are applied to the core. The arms 24, through a crank, serve to connect with a rock shaft 25 on the frame $x$. As already pointed out, the frame $x$ fulcrums at $y$. Pull on the arm 24 serves to tip the frame $x$ over onto the core. Now refer to Fig. 8 and it will be seen that the shaft 25 has a crank arm 26 connected with the plunger rod 29 and the plunger 30 is guided in a bore at the upper end of the frame $x$. A strong coiled spring 31 tends to keep the plunger projected outwardly from the core. The rocking of the crank 26 by the inward pulling of the arm 24 compresses this spring 31. The function of this spring 31 is to first compel the frame $x$ to be tipped upon the core and then allow the arm 24 to swing the fabric laying and smoothing devices upon the core and to yieldingly press them against the core. Refer now to Fig. 21. It is seen that the gear segment 33 is fast to the rock shaft 25. The stroking devices on either side of the core and their drivers are shown. When the frame $x$ is tipped over against the core by the action of the master cam, the friction wheel driver 34 engages the periphery of the core. Segmental pinions 35 are revoluble on the shafts 36 and engage coil torsional springs 46 which in turn actuate shafts 36 keyed to the bracket arms 37 (Fig. 21). Each of these bracket arms 37 carries a sleeve 38. These sleeves 38 journal the bushing 39 into which the screw 40 that adjustably carries the stroking arm 6 is screwed. Fast to the bushing 39 is also a sprocket wheel 41 over which runs a chain 42 (Fig. 8) from the sprocket wheel 43, which is attached to the sleeve 44 which surrounds the shaft 36. This sleeve 44 is driven by the driving wheel 34 which contacts the core. Inasmuch as the sprocket 43 is larger than the sprocket 41, it is evident that the stroking arms are driven at an increased speed over the core speed. The frame arms 45 support the stroking devices and their guiding connections with respect to the frame $x$. The small coiled spring 46 serves as a yielding connection between the pinion 35 and the bracket arm 37 so as to allow the stroking arm to raise when meeting an obstruction. They also exert a pressure upon the stroking devices to keep them yieldingly to the core and allow the position of the stroking device to be slightly changed without changing the operation of the cam and its connections. See position where stroking device is over the bead (Fig. 15).

To summarize the operation of the stroking devices and their connected appliances, the frame $x$ is swung toward the core; the friction wheel 4 dropped on to the core, and the spring 31 is then compressed by the action of the arm 26. The stroking arms are normally held turned back away from the core by the expansive force of the heavy spring 31. When the frame $x$ is pulled over on to the core by the master cam and the rods 24 the stroking arms are clear of the core and any further movement of the cam-controlled arm 24 serves to compress the spring 31 and at the same time press the stroking arms against the core through action of arm 26 and segmental gear 33 and segmental pinions 35, the latter hidden by roller 34 in Fig. 8. The stroking arms yieldingly contact the core because of the action of the torsional spring 46, and also because the whole frame $x$ may yield (through the spring 31) against the positive pull of the arms 24.

The bead-covering rollers have already been described in detail in connection with the description in Fig. 17. They are rotatably mounted upon a small vertical shaft 146, which is threaded into a sleeve in the block 47 and provided with a jam nut 48. The block 47 is provided with a projecting arm 49 which is bolted to the bifurcated terminal of the arm 50 (Fig. 8). Now each of these arms 50 is pivoted on an upstanding stud 51 whose upper end is rigidly attached to the inverted T-like overhanging extension 153 of the frame $x$. Refer to Fig. 10 which is a bottom plan view of this structure. The upper terminals of the arms 50 which are fulcrumed upon these studs 51 are provided with short extensions 53 in the nature of bell crank arms provided with rollers 54 on their ends. The contractile spring 55 normally tends to pull the two arms 50 together and consequently keep the bead-covering roll and the stroking devices in engagement with the core. When the arm 24 (Fig. 1) is first thrust outward by the cam in the process of removing the applying devices from the core, the spring 31 (Fig. 8) expands. In doing so the plunger rod 29 travels outwardly and the extended ends of the pin 56 (Figs. 8 and 10) engage the rollers 54 on the bell crank ends of the arm 50 and open up the arms 50 against the pull of the spring 55 so that the bead-covering roll and the stroking devices can clear the core when the continued thrust of the rod 24 serves to tip the frame $x$ back.

Trimming device.

Carcasses have usually been trimmed by hand as by the workman holding a sharp knife over a suitable guide and then spinning the core. I have provided an automatic device for this purpose shown in Fig. 14. This trimmer need only be secured to one of the fabric applying instrumentalities and is shown in Fig. 1 as carried by the right hand fabric applying instrumentality. The trimmer is carried on a supplemental arm 10 secured to the arm which carries the bead-covering devices. The way these two members are yieldingly held to the core has already been explained. The trimmer is provided with a driving roll 11 (Figs. 1 and 14) which can be brought to bear upon the core and which drives the trimmer 12 through the spur gears 13 (Fig. 1).

The bead-applying apparatus.

The bead-appling apparatus comes into operation after the frames $x$ have been tipped back and the core is stopped and locked in place. It comprises a pair of rings 14 one on each side of the core (Fig. 2). These are ordinarily provided with two short racks 15 suitably guided in brackets 153ª (see left of Fig. 2). These racks engage with a spur pinion 16 journaled on a stub shaft rigidly fastened to the chuck housing. The spur pinion 16 is also fastened to the beveled gear 17 which meshes with the large gear wheel 18 (Fig. 2). After the master cam hereinafter to be described has accomplished the application of two or any determined number of plies to the core, the core is stopped under the control of the master cam and locked in place, and the master cam rotates the large gear wheel 18 and hence causes the bead-bearing rings to advance upon the core through the two racks 15, more clearly shown in connection with the second chuck at the left of Fig. 2. The driving connection between the master cam and the large gear wheel 18 is effected through a multiple disk clutch 19, which thereby provides a slip connection so that when the bead contacts the core the pressure is not stopped but there is a constant pressure exerted upon it by reason of a continuous application of the power, which, however, is allowed to slip at its driving connection through the multiple disk clutch when a sufficient resistance is met with in the core. The driving member of the multiple disk clutch is provided with gear teeth which mesh with the pinion 20 which has a pinion 21 at the opposite end of a common shaft journaled in the frame of the machine. This pinion 21 is in the path of an internal-tooth segment 22 on the master cam. It is evident, therefore, that when this segment strikes the pinion 21, the beads will be caused to advance on the core. The bead-carrying rings are backed away from the core when the core is again rotated as the pressure of the clutch spring 23 is strong enough to pack the clutch disks so that the larger gear wheel 18 remains stationary. Consequently the beveled gear 17 is caused to revolve, which in turn rotates the spur pinion 16 and forces the racks outward to the limit of their travel, after which, the resistance being positive, the clutch and large gear wheel will revolve notwithstanding the pressure of the clutch spring 23.

The beads having been applied, the final plies are placed in the way already indicated.

Tread applying instrumentalities.

Just before the two frames x have been lifted back by the cam action, the cam now brings into operation the tread applying instrumentality shown at the top of Fig. 1 and detailed in Figs. 22 to 25 inclusive. Heretofore the tread has usually been made up of a plurality of strips of rubber and each strip has been put upon the carcass as a separate operation apart from the carcass-making devices. An end view of a composite tread strip is shown in Fig. 25. It will be seen that it is made up of seven strips, two lower layers each comprising three separate strips laid upon each other. The third or top layer is made up usually of a strip of thick rubber compound in which is embedded a layer of fabric 57.

It is the purpose of my apparatus to automatically manufacture a composite strip from the separate strips and automatically apply, measure and sever the tread strip. 58 (Fig. 1) is the main driving roll of the instrumentality and is brought into contact with the core when the master cam drops the frame 59 toward the core. The weight of the frame and a spring having same function as 31 is sufficient to make the driving roll 58 bear with pressure enough upon the core to secure a good driving connection. This driving roll connects by a chain with two pairs of pulleys 60, one member of each pair on each side of the core and which are provided with intermeshing attached gears. These pulleys work on the same principle as the pulleys 3 and they are provided with the same smoothing rings 5 as detailed in Fig. 9 in connection with the fabric applying devices. These pulleys support the coreward ends of the carrying belts 61 which operate to hold the edge zones of the tread the same way that the similar parts operate in connection with the edge zones of the fabric and which serve to prevent longitudinal creasing of the tread and also serve to carry the forward end of the tread on to the core where it is firmly pressed and fastened by its own adhesive properties and the pressure of the driving roll 58. At the opposite end of the belts 61 a pair of main feed rollers 62 are located. These rollers can be more plainly seen in Figs. 22 and 24 and are driven by the belts already alluded to. They are concave and convex at their center tread-carrying portion, the top roller being provided with a central annular rib 63 for fitting into the center V-like groove of the tread strip to center the same in its passage through the apparatus. It will be noted that a number of the other feed rolls have the same annular rib for the same purpose.

The chain 64 connects the sprocket on the farther end of the lower feed roll with a similar sprocket on the lower roll of the second set of feed rolls 65 which are just to the right of the knife 66. The shaft of the upper feed roll 65 carries a loose sprocket 66 connecting through the chain 67 with a third pair of feed rolls 68 just to the left of the knife 66. This set of rolls 68 connects by a chain 69 with a train of feed rolls 70 only one of which is shown in Fig. 22 as the others are omitted to get the view on the sheet and need not be shown for the reason that they are substantially the same as the roller shown.

The third or top layer of rubber is fed from a large storage roll (not shown) and passes between a pair of feed rolls as 71. The liner that lies between the convolutions of the stock upon the storage roll is drawn off on to a take-up roll as 72 which is journaled in the sides of the frame and which is provided with a plural part axle, one part of which may be pressed against the adjacent part by the spring 73 so that the roller and part of the axle may be removed to substitute another take-up roll or remove the liner wound on the old roll. The end of the take-up roll axle is provided with a pulley 74 on which runs the belt 75 connecting with the pulley on the lower feed roll of the feed roll set 71. The belts that connect with the take-up roll are fairly slack so that as the periphery of the take-up roll enlarges with the amount of liner being wound thereon, they will pull the liner because of the tendency of the periphery of the take-up roll to travel faster than the periphery of the feed rolls and pulleys.

The way in which the underlying strips of rubber compound are fed into the main strip and caused to adhere thereto by their gummy and adhesive surfaces is illustrated in connection with the set of feed rolls 70. It will be noted that a couple of stock storage rolls 76 and 77 are journaled in suitable bearings on the side frame to allow of independent removal or attachment thereto. The rubber stock and liner is drawn from the storage rolls up through the feed rolls 70 where it attaches itself to the tread strip already formed by reason of the pressure of these rolls, and the liner is taken off by a take-up roll 78 in a similar way as indicated in connection with the take-up roll 72. It will be understood that the next forward pair of feed rolls (omitted in the drawing) can be made to take a strip of tread material from a centrally located storage roll that provides a strip to follow in at any required zone and that in the same manner other layers can be added to the growing tread strip by feed rolls, storage rolls, and the connected devices. When the strip reaches the set of feed rolls 68 it has grown to its final dimensions.

The completed strip runs through the set of feed rolls 68 over the table 79, through the feed rolls 65 and through the feed rolls 62, where it is taken hold of and guided by the belts on to the core. When the forward part of the tread strip has been carried around the core almost a complete revolution and sufficiently far so that the length of strip drawn under the knife is just a little less than the distance around the periphery of the carcass, the forward end of the tread strip strikes the small roller 80 that is normally hanging in its path. This tips this roller and the arm upon which it is carried, completing an electric circuit at 81 leading through the solenoid 82, whose core is provided at the lower end with a contact roller 83 normally projected into the path of the frame 84. This frame bar 84 is supported on sliding blocks 87 which can slide up and down on the obliquely disposed guide-rods 88. Strong springs 89 are coiled about the guides and tend to thrust the blocks downward, but this tendency is ordinarily resisted by the contact roll 83 which engages under the cross bar 84. There is rigidly held between the sliding blocks of this frame 84 a shaft 86 which supports a swiveled knife-holder 90 to which is screwed the knife blade 66. When the roller 80 is thrown up and the circuit at 81 completed, the solenoid draws up the contact roll 83 and the knife 66 is quickly thrust through the rubber tread strip by the efforts of the springs 89. In Fig. 13, I have shown a water tank 91 having an outflow pipe through which water drips on to a felt-pad 92 held against the knife 66 so that moisture is furnished to assist in cutting the rubber, which under certain conditions cuts much easier when wet. The tank is provided with a depending extension 160 that may be set into the hole in the seat 161 (Fig. 22). The pad-holder (Fig. 13ᵃ) has on its ends dowel pins which can set into dowel holes in the frame.

The master cam now starts to lift the swinging part of the frame 59 (Fig. 1) up around the fulcrum point 93. This throws rearward the connecting rod 94 which is secured to the lever 95 on one end of the rock shaft 96, which has a lever at the opposite end. These two levers have extensions running down and to the rear upon which are carried contact rollers 98 adapted to hook under the lugs 97 projecting outwardly from the sliding blocks. Hence when the cam lifts the swinging frame 59, the current is thrown off and the sliding blocks and the knife are forced upward until the cross bar 84 gets above the contact roller 83, whereupon the spring 99 forces the solenoid roller under the knife frame and holds it in its retracted position ready to repeat the cutting operation.

When the knife operates to cut the strip the clutch 100 is shifted outward as shown in Fig. 22, by reason of a cam lug 101 sliding to the outside of the roller 102 of the clutch arm 103, thereby shifting the clutch outward and thereby throwing off the power from the rollers to the rear of set 65. When the knife has been returned to its upper position as already described, the clutch will be thrown back into engagement with the rear driving train by means of the coiled contractile spring 104, thereby connecting the rear trains of rollers up with the front trains of rollers preparatory to the frame 59 being again tilted toward the core and a source of power furnished.

In connection with the tread applying instrumentality, a plowing device 105 (Fig. 1) is preferably carried by an arm attached to one of the bead-covering devices. This plowing device is detailed in Figs. 18, 19 and 20. It is carried just behind the bead-covering devices of the tread instrumentality. Fig. 20 shows how it appears in operation tipped toward the viewer, ready to plow off the waste of the trimmed edges of the fabric. When this plowing device 105 first contacts this waste 106 (Fig. 18) it bears on the upper outer corner of the waste as shown in Fig. 18. This pressure in conjunction with the rotation of the waste tends to twist the waste and separate it from the bead as shown diagrammatically in Fig. 19. Of course after a few inches have been twisted off, as shown in Fig. 19, the plowing tool drops clear in against the core and then the operation ceases to be a twisting one and is entirely a plowing one.

The fabric feeding and applying operations having been described, and the tread applying, measuring and cutting operations having been detailed, and the trimming operation together with the plowing off of the waste having been described, the operations which complete the automatic functions of this practically complete automatic machine will be narrated, as also the operation of the master cam.

Referring to Fig. 2, it will be seen that the chucks and bead-carrying rings are supported upon a turret 106 which is mounted upon ball bearings upon a pedestal 107. This turret 106 carries two chucks and two sets of bead-carrying rings as indicated in Fig. 2. Consequently while one chuck is presented to the machine the other chuck is in a position where workmen may mount another core and may place another set of beads upon the bead-carrying rings. Hence much time is saved for as soon as a machine has finished one tire shoe the other chuck has been loaded with the core and the beads placed upon the bead-carrying rings ready to be presented to the machine.

When the tire has been completed by the machine, the external-toothed segment 108 (Fig. 26) comes into mesh with the driven gear 109. This is upon a shaft that has a clutch member 110 splined thereto which can be shifted to engage either one or the other of a pair of loose beveled gears 111. These beveled gears are both always in mesh with the beveled pinion 112 (Fig. 26) on the end of a shaft which has fastened thereto a spur pinion 113 which meshes with the sliding rack 114. This spur gear and the rack are well shown in Fig. 2. Now, before this segment 108 engages the gear a raised strip 115 on the side of the segment (Fig. 27) has engaged the roller 116 (the left hand one, Fig. 28) and shifted the clutch 110 so as to lock the gear 109 and the left hand beveled gear 111 together. This combination will drive the pinion 112 clockwise, rotating the spur pinion 113 clockwise and forcing the rack 114 outward with respect to the machine frame.

Now referring to Fig. 2, it will be seen that the rack 114 is connected with a slide 117 that is bolted to the turret pedestal 107. The slide and the turret pedestal slide on proper guides and tracks 154 (Fig. 1) so that when the rack 114 moves outward from the machine frame and turret pedestal the completed tire upon the chuck moves out of the machine housing until the turret pedestal strikes the switch button 119 (Fig. 2). This shuts off the current of the motor M and applies a solenoid brake 159, bringing immediate stoppage to the power.

The workman may now depress the pedal 120 (Fig. 2) which separates the parts of the jaw clutch 121 and allows the turret to be revolved, bringing a new core and beads toward the machine and throwing the completed tire in a position where it may be easily taken off the chuck by the workman.

The operator of the machine may now press one of the switch buttons 121ᵃ on top of the machine frame and again set the motor in operation. The first operation will be for the strip 122 (Fig. 27) on the cam to engage the right hand roller 116 on the clutch shifter, thereby locking the right hand beveled gear 111 and gear 109, and resulting in driving the rack 114 back into the machine when the second segment 123 comes into mesh with the gear 109. This causes the turret pedestal and its load together with the slide 117, to advance into the machine. It will be noted that the slide 117 is connected to the rack 114 by a bolt and coiled spring 124. When the fluted central aperture of the chuck fully engages the fluted end of the chuck shaft, the turret pedestal and the slide can travel no farther, but the rack 114 travels a slight distance farther and compresses the spring 124. When the cam segment 123 has traveled away from the gear wheel 109 the compressed spring 124 spreads out and pulls the rack outward slightly, causing the two beveled gears 111 to revolve far enough to insure the clutch pins dropping into the pin-apertures, and the clutch now being in central position, this locks all these gears together and also has the further important function of locking the turret pedestal and the chuck so that the work will be held to the machine.

The master cam has been rotated by the worm 125 engaging with the worm gear 126 on a sleeve 127 which is provided with a spur gear 128 that, through an idler, meshes with the internal teeth 129 on the master cam. All the time the chuck has backed away from and backed again into the machine, the drive shaft 130 for the chuck has been locked against rotation as the clutch 131 has been shifted to the right so that the clutch pins engage in the apertures 132 of the machine frame. This shifting of the clutch to the right is effected by the bell crank arm 133 which has a ball terminal that travels in a race 134 in the face of the cam. When the segment 123 is disengaged from the gear 109, as already explained, the work is backed into the machine. Now the cam race 134 swings outwardly on the cam and the clutch 131 is disengaged from the frame and engaged with the driving worm wheel 126, thereby coupling up the chuck shaft 130 with the power. The core itself now begins to rotate. Now referring to Fig. 26, it will be seen that about the time the segment 123 disengages from the gear 109, what might be termed the high part 135 of a cam race engages the roller 136 upon the lever 137 which is connected with both the rods 24, whose office has already been alluded to as that of tipping the frames *x* of the fabric applying instrumentalities toward and away from the core. Considering the high part 135 of the cam race that carries the roller 136 now beside this roller, it is apparent that both the rods will be pulled in and hence both the fabric applying instrumentality frames will be swung toward the core. It will be seen that the cam race next presents a low portion. During this time the bead is being applied, and the cam race 134 is shaped so as to now operate the clutch 131 and the stop the rotation of the chuck, while the bead is being applied, by means of the segment 22 of the master cam engaging the gear 21 and operating the racks 15 in the manner already described.

The chuck shaft is again connected up with the power by means of the bell crank lever 133 and the proper direction of the cam race 134 and the bead rings are backed away from the chuck. The second high spot 138 of the cam race that guides the roller 136 now throws the roller 136 out and again brings the fabric applying instrumentalities to the core. Just before the ends of the last fabric plies have been put on the core, the cam race 139 comes into operation engaging the roller 140 on the crank arm 141, pulling down the rod 142 which connects with the tread applying instrumentality, thereby now bringing this instrumentality into operation. Then the fabric applying instrumentalities are swung back. The core continues to revolve until the tread has been applied and the waste adjacent the bead cut off. Then the toothed segment 108 again engages the gear 109 and backs the completed tire out of the machine until the switch button 119 turns off the power and presents the completed tire to the workman. The tire is now complete for everything except the vulcanization in the mold.

Of course it will be understood that the tread-forming instrumentality could be replaced by another fabric applying instrumentality in tires of heavier type where it is customary to build up a tread portion, vulcanize it, and cement it to a partially vulcanized carcass, after which the whole is wrapped in damp clay and rags and finished by vulcanization.

What I claim is:

1. In a tire building machine, the combination of carcass building instrumentalities and tread building and applying instrumentalities arranged to automatically coöperate in building a tire.

2. In a tire building machine, the combination of a fabric laying and smoothing instrumentality, and a tread laying and smoothing instrumentality arranged to automatically coöperate in building a tire.

3. In a tire building machine, the combination of a fabric laying and smoothing instrumentality, and a tread laying and smoothing instrumentality arranged to automatically, one follow the operation of the other.

4. In a tire building machine, the combination of a fabric laying and smoothing instrumentality, a tread laying and smoothing instrumentality, and means for automatically measuring off and separating the proper length of tread to be applied to the core.

5. In a tire building machine, the combination of a fabric laying and smoothing instrumentality, a trimmer for the edge of the fabric, and means for plowing off the waste.

6. In a tire building machine, the combination of a fabric laying and smoothing instrumentality, a trimmer for the edge of the fabric, and means for removing the waste.

7. In a tire building machine, the combination of a fabric laying and smoothing instrumentality, a trimmer, and a blade adapted to first encounter the corner of the strip of waste to turn it off and then adapted to plow the waste off.

8. In a tire building machine, the combination of a fabric laying and smoothing instrumentality, and a trimmer in the form of a rotating sharpened edge disk driven by a roll contacting with the core.

9. In a tire building machine, the combination of a fabric laying and smoothing instrumentality, a tread laying and smoothing instrumentality, a trimmer, and a plowing device plowing off the waste and carried on the tread-laying frame.

10. In a tire building machine, the combination of a fabric laying and smoothing instrumentality, a bead applying instrumentality, and means for automatically stopping the fabric laying instrumentality, bringing into operation the bead applying instrumentality and finally again bringing into operation the fabric laying and smoothing instrumentality.

11. In a tire building machine, the combination of a fabric laying and smoothing instrumentality and a bead applying instrumentality, the latter comprising bead-carrying rings having means for automatically advancing them upon the core and backing them away from the core between the first and second operation of the fabric applying and smoothing instrumentality.

12. In a tire building machine, the combination of a fabric laying and smoothing instrumentality, a tread laying and smoothing instrumentality, and a master cam for bringing the fabric laying and smoothing instrumentality into engagement with the core and upon the disengagement of this instrumentality bringing the tread laying and smoothing instrumentality into engagement with the core.

13. In a tire building machine, the combination of a fabric laying and smoothing instrumentality, a rotating core, means for automatically stopping the core and the instrumentality and for locking the core against rotation, and automatically operated bead-carrying rings for applying the bead to the core when the same is stopped.

14. In a tire building machine, the combination of a fabric laying and smoothing instrumentality, a rotating core, means for disengaging the instrumentality from the core, stopping the core and locking the same, and bead applying means automatically operated to apply the bead during the stoppage of the core.

15. In a tire building machine, the combination of a fabric laying and smoothing instrumentality, a rotating core, means for lifting the instrumentality from the core, bead rings, and means for causing the bead rings to advance and back away from the core, said means lifting the fabric laying and smoothing instrumentality following the bead operating means to again apply the fabric applying instrumentality to the core.

16. In a tire building machine, a bead applying instrumentality, comprising bead-carrying rings that slide in and away from the core, power transmission devices, and a slip clutch connection in such transmission for causing them to slide in to the core and to exert pressure upon the core, and means for automatically starting and stopping the power transmission devices.

17. In a tire building machine, a rotatable core, a bead applying instrumentality, comprising a pair of bead-carrying rings adapted to slide toward and away from the core, a pair of racks upon which the bead-carrying rings are supported, a spur pinion carried along with the core and engaging with the racks, a beveled pinion fast to the spur pinion, a large gear wheel meshing with the beveled pinion, a clutch for connecting the gear wheel with the source of power, and a clutch spring calculated upon the rotation of the core to hold the gear wheel stationary to allow the bead-carrying rings to back out from the core when the core rotates.

18. In a tire building machine, a bead-carrying instrumentality, comprising with a chuck housing having radial shafts upon which are located spur and beveled pinions, a pair of racks meshing with each spur pinion, bead-carrying rings secured to the ends of the racks, a large gear wheel meshing with the beveled pinions, a multiple disk clutch for driving the large gear wheel, and a pressure member for packing the clutch disks which is calculated so as to hold the clutch and gear wheel while the bead-carrying rings back away from the core as it revolves.

19. In a tire building machine, a strip laying and smoothing instrumentality, comprising belts which take the strip and lay it upon the core, and means for pressing the strip to the core.

20. In a tire building machine, a strip laying and smoothing instrumentality, comprising two pairs of substantially contacting belts for carrying and guiding the strip onto the core, and means for pressing the strip to the core.

21. In a tire building machine, a strip laying and smoothing instrumentality, comprising a pair of feed rolls having central strip engaging portions and end pulley portions, two sets of pulleys rotatably supported on opposite sides of the core when the instrumentality is applied thereto, and strip carrying belts running over the last-mentioned pulleys and the pulley portions of the feed rolls.

22. In a tire building machine, a strip laying and smoothing instrumentality, comprising a set of rolls, two pairs of pulleys engaging on opposite sides of the core when the instrumentality is applied thereto, some of the pulleys being provided with rings spring-thrust out of the ends thereof and acting to lay the strip upon the side zones of the core, and strip-carrying belts running over the pulleys and the rolls.

23. In a tire building machine, and in a strip laying and smoothing instrumentality thereof, a pair of belt pulleys, sleeves whose ends will contact the core, and means for yieldingly projecting said sleeves out of the ends of the pulleys and toward the core, said sleeves adapted to smooth the strip on the core while the said pulleys serve to carry conveying belts.

24. In a tire building machine, and in a strip-laying and smoothing instrumentality thereof, a pair of belt pulleys, sleeves having turned-over flanges, and means for yieldingly projecting said sleeves out of the ends of the pulleys and toward the core, the said sleeves adapted to smooth the strip on the strip on the core.

25. In a tire building machine, and in a strip-laying and smoothing instrumentality thereof, a strip-smoothing device comprising a plurality of continuously rotating rotatable radial arms carrying rollers on their ends, said arms striking the carcass at an acute angle to their common plane.

26. In a tire building machine, and in a strip-laying and smoothing instrumentality thereof, a strip-smoothing device comprising a plurality of rotating spring arms carrying rollers on their ends.

27. In a tire building machine, and in a strip-laying and smoothing instrumentality thereof, a strip stroking device comprising a plurality of spring arms and means for positively driving said arms, said arms being arranged to strike and smooth the strip upon the tire.

28. In a tire building machine, and in a strip laying and smoothing instrumentality thereof, a strip stroking device comprising a plurality of rotating spring arms set in a plane substantially common to the plane of the undercut portion of the core but tipped slightly therefrom at the rear of the device.

29. In a tire building machine, and in a strip laying and smoothing instrumentality thereof, a strip smoothing device comprising a rotating member adapted to contact with the strip and smooth it upon the sides of the core, a bracket arm upon which said rotating member is journaled, a shaft supporting the bracket arm, a friction wheel, driving connections between the friction wheel and said rotating member, yielding means providing pressure to hold the friction wheel on the core, and means for supporting the shaft.

30. In a tire building machine, and in a strip laying and smoothing instrumentality thereof, a smoothing device comprising a rotating member adapted to smooth the strip upon the core, a bracket arm for journaling the same, a shaft attached to the bracket arm, a gear segment mounted on the end of the shaft, a sleeve and pulley rotating on the shaft, a torsional spring attached at one end to the gear segment and at the other end to the shaft, driving connections between the rotating smoother and the pulley, means for rotatably supporting the shaft, and means for engaging the gear segment to bring the rotating smoother into contact with the core.

31. In a tire building machine, and in a strip laying and smoothing instrumentality thereof, a bead-covering device comprising a roller complementary in cross section to the top and outside of the bead and having below the bead a plurality of spring arms stressed by their contact with the under side of the bead.

32. In a tire building machine, and in a strip laying and smoothing instrumentality thereof, a swinging frame, a strip smoothing device swingingly supported thereon, means tending to yieldingly hold the strip smoothing device away from the core, a pair of bead-covering devices, a pair of arms supporting the same, means tending to draw the arms together, said arms being arranged with respect to the means which yieldingly hold the strip-smoothing device so that when such means is free to fully expand it opens the bead device carrying arms to allow them to clear the tire, and means for pulling the frame over on the core and then swinging the strip-smoothing device onto the core as against its said yielding holding means.

33. In a tire building machine, and in a strip laying and smoothing instrumentality thereof, a swinging frame, a strip-smoothing device swingingly supported on the frame, a plunger, a plunger rod connected with the strip-smoothing device, a plunger guide, a spring for yieldingly engaging the plunger and holding the strip-smoothing device away from the core, and means connected with said plunger and rod for pulling them against the spring to tip the frame upon the core and turn the strip smoothing device against the core.

34. In a tire building machine, and in a strip-laying and smoothing instrumentality thereof, a swinging frame, a strip-smoothing device swingingly supported on the frame, a plunger and plunger rod connected with the strip-smoothing device, a guide and a spring for yieldingly pressing the plunger and holding the swinging strip-smoothing device clear of the core, a pair of bead-covering devices, connections between the bead-covering devices and plunger rod for separating the bead-covering devices so that they will clear the core when the said coil spring is free to fully expand, and means connected with said plunger and rod for pulling them against the spring to tip the frame upon the core and turn the strip-smoothing device against the core.

35. In a tire building machine, a feeding apparatus comprising a rear train of rollers and a front train of rollers, and means for automatically stopping and locking the rear train of rollers when a spliced joint between two adjacent plies lies between the front and rear train of rollers.

36. In a tire building machine, a feeding apparatus, having in combination, a plurality of rollers, the intermediate rollers of which are divided so that the ends rotate independently, forming a front and rear train of rollers and part rollers divided on an oblique line, and means for automatically stopping the rear train of rollers and locking the same when a splice between two pieces comes between the front and rear train of rollers and part rollers.

37. In a tire building machine, a feeding apparatus, a front and rear train of rollers independently driven, a clutch controlling the rear train of rollers, a trip roller running on the strip, and connections between the trip roller and the clutch whereby when the trip roller is raised by a splice coming thereunder the clutch is shifted to disconnect the power from the rear train of rollers and lock the same.

38. In a tire building machine, a feeding apparatus, having in combination, a front and rear train of rollers independently driven, a clutch for controlling the driving of the rear train of rollers, a spring normally tending to keep the clutch disengaged and locking the rollers stationary, a rod connected with the clutch, a rock shaft, a trip roller bearing upon the strip and carried on the rock shaft, a trip lever on the end of the rock shaft, and a catch on the end of the said rod for engaging the trip lever and keeping the clutch engaged with the rear train of rollers and whereby when the spliced ends of the pieces raise the roller it disengages the trip lever from the catch allowing the clutch to disengage.

39. In a tire building machine, a feeding apparatus, a front and rear train of feed rollers independently driven, a clutch for controlling the driving of the rear train, a trip roller running over the stock and raised by the spliced ends to disengage the clutch, a swinging frame for applying the fabric to the core, and a connection between the swinging frame and the clutch so that when the swinging frame is thrown away from the core this connection is operated to again engage the clutch with the rear train of rollers.

40. In a tire building machine, a chuck for carrying the core, means for applying fabric to the core, and means for automatically causing the chuck to advance into the fabric-applying means when the power is turned on and to automatically back away from the fabric-applying means when the machine operations are completed.

41. In a tire building machine, the combination of a machine frame and elements serving to work upon the tire, a chuck, a core carried thereby, and means operated by mechanical power for automatically advancing the chuck into the machine and automatically backing it out of the machine when the work is done.

42. In a tire building machine, a sliding member, a chuck carried on the sliding member, a machine frame and elements for working on the tire, a gear wheel for driving the said slide antecedent to the work on the tire and subsequent to the work on the tire, power connections to effect such driving at such times, and an automatically-operated clutch to alternately reverse the direction of the gear so as to first pull the slide into the machine and then back it out.

43. In a tire building machine, a slide, a chuck carried thereon, a rack secured thereto by a spring connection, a gear wheel engaging the rack and operated antecedent to the work on the tire and subsequent to the work on the tire, a spring pin clutch and means for transmitting power at assigned intervals through the spring pin clutch to the gear wheel, said clutch being automatically operated to alternately reverse the power and transmit it to the gear wheel, and the said spring connection between the rack and slide serving to slightly rotate the clutch members after the power has ceased for the purpose of insuring the spring pins engaging in the apertures.

44. In a tire building machine, the combination of a slide, a chuck carried on the slide, and means for automatically advancing the chuck into the machine and automatically backing it out of the machine when the work is completed, the same means serving in the interim to lock the chuck in a determined position.

45. In a tire building machine, a cam wheel, a chuck, a slide supporting the chuck, a rack connected with the slide, a spur gear and shaft, the gear engaging with the rack, a pair of oppositely facing beveled pinions loose on a second gear shaft, said second gear shaft, a clutch for connecting either one or the other of the beveled pinions to the second shaft, a beveled gear in mesh with both the first-mentioned beveled gears and located on the first shaft, a driving gear on the end of the second gear shaft, toothed segments on said cam wheel for twice rotating the driving gear for one rotation of the cam wheel, and cam strips on the cam wheel for engaging portions of the clutch to shift it and thereby alternately reverse the direction of the rack.

46. In a tire building machine, the combination of a plurality of chucks, a rotating turret for carrying the same, a turret pedestal, a jaw clutch lock for locking the turret to the pedestal, and a pedal for disengaging the lock.

47. In a tire building machine, a fabric-applying instrumentality, a cam wheel governing the operation of the fabric-applying instrumentality, a bead-applying instrumentality, power connections for driving the cam wheel and mediately the fabric-applying devices and the bead-applying devices, a clutch, and connections between the clutch and cam wheel whereby the cam wheel disengages the clutch to disconnect the power from the fabric-applying devices during the beading operation and again connects the power to the fabric-applying devices after the completion of the beading operation.

48. In a tire building machine, the combination of a rotatable chuck, a fabric-applying instrumentality including a swinging frame which brings the fabric-applying instrumentality into operation, a bead-applying instrumentality, power connections for operating the same, a rotating cam, and a clutch for the power connections connected with the cam so that the power is disconnected when the fabric-applying instrumentality is swung away from the core and the chuck is stopped and locked to the frame while the bead-applying apparatus operates and when the beading operation is completed the power is again applied to the chuck.

49. In a tire building machine, and in a tread-applying instrumentality thereof, the combination of means for feeding the tread to the carcass, and means for severing a predetermined amount of tread.

50. In a tire building machine, and in a tread-applying instrumentality thereof, the combination of means for feeding the tread upon the carcass of the tire, and means for automatically severing the tread strip when a complete annulus around the tire has been had.

51. In a tire building machine, and in a tread-applying instrumentality thereof, the combination of means for feeding the tread upon the tire carcass, means for severing the tread when a predetermined amount has been fed upon the carcass, and means for automatically stopping the feeding means when such severing operation takes place.

52. In a tire building machine, and in a tread-applying instrumentality thereof, the combination of means for feeding a tread upon the tire carcass, means for cutting the rubber tread at a predetermined point, and means for furnishing a fluid to such cutting mechanism to assist in the cutting.

53. In a tire building machine, and in a tread-applying instrumentality thereof, the combination of means for feeding a tread upon the tire carcass, means for cutting the tread at a predetermined point, and means for furnishing a liquid to the cutting mechanism, comprising a tank having a drip spout and a felt located under the drip spout and held against the cutting mechanism.

54. In a tire building machine, and in a tread-applying instrumentality thereof, the combination of means for feeding a tread to the tire carcass, a knife held in raised position and provided with means for projecting it across the tread, and a trip device located in proximity with the tire carcass so that when the forward end of the tread has nearly completed a revolution with the tire carcass, the said trip device is operated to release the knife and sever the tread.

55. In a tire building machine, and in a tread-applying instrumentality thereof, the combination of means for feeding a tread strip upon the tire carcass, a knife ordinarily held in raised position and provided with means for projecting it across the tread strip when released from its raised position, a trip device held in proximity to the tire carcass and arranged to be thrown by the forward end of the tread when it has nearly completed a revolution with the core, and a solenoid for holding the knife in raised position and operated to release the knife when the trip device is thrown.

56. In a tire building machine, and in a tread-applying instrumentality thereof, the combination of means for feeding a tread strip upon the tire carcass, a clutch for controlling a portion of said feeding means, a knife for severing the tread strip held in raised position normally and provided with means for projecting it across the tread strip when released, a trip device secured in proximity to the tire carcass and arranged to be thrown by the forward end of the tread strip when it has nearly completed a revolution with the tire carcass, a clutch shifting device, and means on the said knife for striking the clutch shifting device in its descent and throwing out the clutch.

57. In a tire building machine, and in a tread-applying instrumentality thereof, the combination of means for feeding a tread strip upon the tire carcass, means for severing the same when a predetermined amount of tread has been fed upon the tire carcass, tread-applying devices, a swinging frame upon which said tread-applying devices are carried, a clutch for governing the application of power to a portion of the feeding means and arranged to be thrown out by the tread-severing mechanism when released, and connections with said clutch for throwing the clutch back into engagement when the swinging frame upon which the tread-applying devices are carried is swung back from the tire carcass.

58. In a tire building machine, and in a tread-applying instrumentality thereof, the combination of feeding means, means for pressing the tread strip upon the tread portion of the carcass, means for pressing and smoothing the tread strip on the side zones, means for pressing and smoothing the tread strip on the undercut zones of the carcass and automatically operated means for severing the tread strip.

59. In a tire building machine, and in a tread-applying instrumentality thereof, the combination of a plurality of feeding devices so arranged that various strips of stock that go into a composite tread member are fed into one composite strip, and automatic means for feeding and applying said strip as it is formed directly on to the carcass.

60. In a tire building machine, and in a tread-applying instrumentality thereof, the combination of a plurality of storage rolls, a plurality of liner take-up rolls, feed rolls, said rolls being so arranged that the various strips that go to make up a composite tread are drawn off from the storage rolls and fed together to form a compound strip, and automatic means for feeding and applying said strip as it is formed directly to the carcass.

61. In a tire building machine, and in a tread-applying instrumentality thereof, the combination of a plurality of storage rolls and feed rolls, said rolls being arranged to feed the various strips that make a composite tread together, and some of the rolls being provided with central annular ribs which run in complementary grooves in the top strip to center the same.

62. In a tire building machine, the combination with an automatic feeding device, of an automatic swabbing device, comprising a liquid-holding tank, a belt running in said tank and into a position of contact with the strip of fabric and an adjustable wiping clip.

63. In a tire building machine, and in a tread-applying instrumentality thereof, the combination of a plurality of storage rolls, feed rolls, said rolls being so arranged that the various strips that go to make up a composite tread are drawn off from the storage rolls and fed together to form a compound strip, means for feeding and applying the strip to the carcass as the strip is formed, and means for automatically starting and stopping this feeding and applying means.

64. In a tire shaping machine, the combination of automatic mechanism for feeding the fabric and forming it into a tire carcass, and mechanism automatically coöperating therewith for subsequently applying a tread thereto.

65. In a tire building machine, a plurality of strip-smoothing and applying devices circumferentially arranged about the core, and automatic means to withdraw them to allow the core to enter into or withdraw from operative relation.

66. In a tire building machine, the combination of a fabric laying and smoothing instrumentality, a bead applying instrumentality, and means for automatically stopping the fabric laying instrumentality and automatically bringing into operation the bead applying instrumentality.

67. In a tire building machine, a chuck for carrying the core, means for applying fabric to the core, means for automatically advancing the chuck within reach of the means for applying the fabric to the core, and means for automatically starting the fabric applying means when the core has taken its position in the machine.

68. In a tire building machine, a chuck for carrying the core, means for applying strip material to the core, and means operated by mechanical power for automatically causing the chuck to back away from the strip applying means when the same have finished their work.

69. In a tire building machine, and in a strip-laying and smoothing instrumentality thereof, a swinging frame, a strip-smoothing device supported to swing on said frame, yielding means for holding the said strip-smoothing device tipped back on the frame and away from the core, an arm having connection with said yielding means and also with the strip-smoothing device, the said latter connection including a further yieldable element, whereby the arm first swings the said frame upon the core and then tips the strip-smoothing device upon the core where the same has a yieldable contact by reason of the two yieldable members.

70. In a tire building machine, and in a strip-laying and smoothing instrumentality thereof, a swinging frame, a strip-smoothing device supported to swing on the frame, a gear portion having operative connection with the strip-smoothing device, a spring, a rock shaft, connections between the rock shaft and spring requiring the compression of the latter when the rock shaft is rocked, means for rocking the rock shaft, and a gear segment on the rock shaft meshing with the first-mentioned gear portion.

71. In a tire building machine, and in a strip-laying and smoothing instrumentality thereof, a swinging frame, a strip-smoothing device supported to swing on the frame, a gear portion, a torsional spring connected with the gear portion and the said strip-smoothing device, a rock shaft supported on said frame, a gear segment on the rock shaft and meshing with said first-mentioned gear portion, a spring for resisting the rotation of the rock shaft in one direction, and means for pulling the frame on the core connected with said rock shaft to rock the same when the frame is pulled over on the core.

72. In a tire building machine, and in a strip-laying and smoothing instrumentality thereof, a swinging frame, a strip-smoothing device supported to swing on the frame, yielding means having connection with the said strip-smoothing device to maintain the same tipped away from the core, an arm operatively connected to the said frame through the said yielding means and to the strip-smoothing device, the two said connections requiring the compression of the yielding means before independent relative movement can be had between the strip-smoothing device and the said swinging frame.

73. In a tire building machine, and in a strip-laying and smoothing instrumentality thereof, a swinging frame, a strip-smoothing device supported to swing on the frame, a spring on the frame, a plunger at one end of the spring, a plunger rod running through the spring, a rock shaft, an arm having connection with the rock shaft, connections between the rock shaft and the plunger rod, and connections between the rock shaft and the strip-smoothing device, whereby the rock shaft may swing the strip-smoothing device, when actuated by the arm, against the expansive force of the spring.

74. In a tire building machine, and in a strip-laying and smoothing instrumentality thereof, a swinging frame, a strip smoothing device supported to swing on said frame, a spring, a plunger abutting against one end of the spring, a plunger rod provided with protruding members, bead-covering device arms yieldingly tending together and provided with bell crank extensions arranged to be struck by the protruding members on the plunger rod when the spring is released from compression, means for pulling the frame over on the core and then exerting a pulling force on the plunger and rod to compress the spring, and connections between the said pulling means and plunger rod and the said strip-smoothing device.

75. In a tire building machine, a fabric-laying and smoothing instrumentality, having feeding and smoothing devices driven from the core, a tread-laying and smoothing instrumentality having feeding and smoothing devices driven from the core, the said two instrumentalities being mounted to approach and draw away from the core, and means for automatically causing the first-mentioned instrumentality to contact, operate upon and then draw away from the core, and for then causing the second-mentioned instrumentality to contact, operate upon the carcass and then draw away.

76. In a tire building machine, a fabric-laying and smoothing instrumentality, a bead-applying instrumentality, and automatic means for causing the fabric-laying and smoothing instrumentality to approach, operate upon, and withdraw from the core, and for then causing the bead-applying instrumentality to approach, operate upon, and withdraw from the carcass, and for then causing the fabric-laying and smoothing instrumentality to return, operate upon and withdraw from the carcass.

77. In a tire building machine, a fabric-laying and smoothing instrumentality, a bead-applying instrumentality, a tread-applying instrumentality, all movable onto and away from the core, and automatic means for causing each to successively approach and draw away from the core, the fabric-laying and smoothing instrumentality returning a second time after the withdrawal of the bead-applying instrumentality.

78. In a tire building machine, a fabric-laying and smoothing instrumentality, a bead-applying instrumentality, a tread-applying instrumentality, all movable onto and away from the core, automatic means for causing each to successively approach and draw away from the core, the fabric-laying and smoothing instrumentality returning a second time after the withdrawal of the bead-applying instrumentality, and means for automatically causing the core to draw into the working zone of said instrumentalities before any of them is applied to the core and for withdrawing from the working zone when the last has withdrawn from the carcass.

79. In a tire building machine, a fabric-laying and smoothing instrumentality, a second fabric-laying and smoothing instrumentality for starting a second strip of fabric from a different point on the core, and means for simultaneously bringing said two instrumentalities into operation on the core.

80. In a tire building machine, a fabric-laying and smoothing instrumentality mounted to approach and draw away from the core, a tread-laying and smoothing instrumentality mounted to approach and draw away from the core, and means for automatically causing the first instrumentality to approach and draw away from the core and subsequently the second mentioned instrumentality to approach and draw away from the core.

81. In a tire building machine, a fabric-laying and smoothing instrumentality mounted to swing to and from the core, a tread-laying and smoothing instrumentality mounted to swing to and from the core, a master cam, and connections between the cam and the two instrumentalities for causing the fabric-laying and smoothing instrumentality to first swing onto the core and then away from the core, and for then causing the tread-laying instrumentality to swing onto the core and then away from the core.

82. In a tire building machine, a master cam provided with a cam race, a fabric-laying and smoothing instrumentality drawn upon and away from the core by connections therewith, the said master cam provided with a second cam race, and a tread-laying and smoothing instrumentality subsequently drawn onto and away from the carcass by connections with the second cam race.

83. In a tire building machine, a master cam provided with a cam race, a fabric-laying and smoothing instrumentality, connections between the race and instrumentality for drawing the latter onto and away from the core, the said master cam being provided with a second cam race, a tread-laying and smoothing instrumentality, connections between the second race and the second instrumentality for drawing the latter onto and away from the carcass, bead-applying apparatus, a gear segment on the cam, and connections between the bead-applying apparatus and the gear segment for causing the apparatus to approach the carcass between the operations of the first-mentioned instrumentalities.

84. In a tire building machine, a master cam provided with a cam race, a fabric-laying and smoothing instrumentality, connections between the race and instrumentality for drawing the latter onto and away from the core, the said master cam being provided with a second cam race, a tread laying and smoothing instrumentality, connections between the second race and the second instrumentality for drawing the latter onto and away from the carcass, bead-applying apparatus, a gear segment on the cam, connections between the bead-applying apparatus and the gear segment for causing the apparatus to approach the carcass between the operations of the first-mentioned instrumentalities, a chuck slidable toward and away from the instrumentalities and apparatus above enumerated, segments on said cam, and connections between the segments and the chuck for causing the chuck to draw into the machine before the said instrumentalities and apparatus operate and for causing the chuck to withdraw from the machine when said instrumentalities and apparatus have done with operating.

85. In a tire building machine, a master cam provided with a cam race for controlling the approach and withdrawal of a fabric-applying mechanism, provided with a second cam race for controlling the approach and withdrawal of a tread-applying instrumentality, provided with a gear segment for controlling the approach of a bead-applying apparatus, provided with a pair of gear segments for causing movement of the chuck bearing the core and provided with segmental strips for throwing a clutch to reverse the chuck movement.

86. In a tire building machine, a fabric-laying and smoothing instrumentality, a bead-applying apparatus, and a tread-laying and smoothing instrumentality arranged to automatically work on the tire carcass in succession to automatically produce a complete carcass.

87. In a tire building machine, a fabric-laying and smoothing instrumentality, bead-applying apparatus, a tread-laying and smoothing instrumentality, a chuck for carrying the core, the said two instrumentalities and the said apparatus arranged to operate successively to build the tire carcass, and means for automatically causing the chuck to go into the machine and for automatically causing it to withdraw from the machine when the carcass is completed.

In testimony whereof, I sign this specification.

ADRIAN O. ABBOTT, Jr.